United States Patent
Kobayashi

(10) Patent No.: US 9,991,718 B2
(45) Date of Patent: Jun. 5, 2018

(54) POWER INTERCHANGE SYSTEM, POWER TRANSMITTING/RECEIVING DEVICE, POWER INTERCHANGE METHOD, AND PROGRAM

(71) Applicant: NEC Corporation, Tokyo (JP)

(72) Inventor: Noriaki Kobayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 517 days.

(21) Appl. No.: 14/434,030

(22) PCT Filed: Aug. 23, 2013

(86) PCT No.: PCT/JP2013/004979
§ 371 (c)(1),
(2) Date: Apr. 7, 2015

(87) PCT Pub. No.: WO2014/057601
PCT Pub. Date: Apr. 17, 2014

(65) Prior Publication Data
US 2015/0255986 A1 Sep. 10, 2015

(30) Foreign Application Priority Data
Oct. 9, 2012 (JP) ................. 2012-224126

(51) Int. Cl.
*H02J 3/46* (2006.01)
*H02J 13/00* (2006.01)
(52) U.S. Cl.
CPC ............ *H02J 3/46* (2013.01); *H02J 13/00* (2013.01); *H02J 13/0006* (2013.01); *Y04S 10/12* (2013.01); *Y10T 307/696* (2015.04)
(58) Field of Classification Search
CPC .............. H02J 3/04–3/08; H02J 3/34; H02J 3/38–3/50
See application file for complete search history.

(56) References Cited

U.S. PATENT DOCUMENTS

| | | | |
|---|---|---|---|
| 2003/0009265 A1* | 1/2003 | Edwin | G06Q 10/06 700/295 |
| 2004/0010478 A1* | 1/2004 | Peljto | G05B 19/00 705/412 |

(Continued)

FOREIGN PATENT DOCUMENTS

| | | |
|---|---|---|
| JP | 2002-044870 A | 2/2002 |
| JP | 2002-281666 A | 9/2002 |

(Continued)

OTHER PUBLICATIONS

Extended European Search Report issued in corresponding European Application No. 13846214.8, dated Apr. 25, 2016, 8 pages.

(Continued)

*Primary Examiner* — Rexford Barnie
*Assistant Examiner* — David Shiao
(74) *Attorney, Agent, or Firm* — Wilmer Cutler Pickering Hale and Dorr LLP

(57) ABSTRACT

A power interchange system preferentially transmits electric power from a suitable power supply. A controller (100) includes signal sending/receiving means (300) for receiving information regarding a power transmitting/receiving device (101); power transmitting/receiving device information storage means (310); priority information storage means (310); and information control means (301) for determining, based on the information regarding the power transmitting/receiving device (101) and the priority of the power supply (104*b*), an amount of power to be transmitted and the power transmitting/receiving device (101) which is to transmit electric power, and creating, based on the determination, a control instruction to make the power transmitting/receiving device (101) transmit electric power. The signal sending/receiving means (300) transmits the control instruction to at least the power transmitting/receiving device (101), the (Continued)

power transmitting/receiving device (101) transmits electric power according to the control instruction.

11 Claims, 9 Drawing Sheets

(56) References Cited

U.S. PATENT DOCUMENTS

| | | | | |
|---|---|---|---|---|
| 2004/0098142 | A1* | 5/2004 | Warren | F01D 15/10 |
| | | | | 700/22 |
| 2008/0039980 | A1* | 2/2008 | Pollack | B60L 11/1824 |
| | | | | 700/295 |
| 2009/0076661 | A1* | 3/2009 | Pearson | H01M 8/04619 |
| | | | | 700/291 |
| 2011/0106321 | A1* | 5/2011 | Cherian | H02J 3/00 |
| | | | | 700/286 |
| 2012/0053751 | A1* | 3/2012 | Borresen | G05B 13/04 |
| | | | | 700/297 |
| 2012/0095612 | A1* | 4/2012 | Rivers, Jr. | H02J 3/14 |
| | | | | 700/297 |
| 2012/0249048 | A1* | 10/2012 | Nishibayashi | H01M 10/482 |
| | | | | 320/101 |
| 2013/0131876 | A1* | 5/2013 | Lee | H04L 12/10 |
| | | | | 700/286 |
| 2013/0166085 | A1 | 6/2013 | Cherian et al. | |
| 2014/0006137 | A1* | 1/2014 | Melen | G06Q 10/1093 |
| | | | | 705/14.35 |
| 2014/0114844 | A1* | 4/2014 | Forbes, Jr. | G05D 17/00 |
| | | | | 705/39 |
| 2015/0012146 | A1 | 1/2015 | Cherian et al. | |

FOREIGN PATENT DOCUMENTS

| | | |
|---|---|---|
| JP | 2003-032887 A | 1/2003 |
| JP | 2004-015882 A | 1/2004 |
| WO | WO-2012/124368 A1 | 9/2012 |

OTHER PUBLICATIONS

International Search Report corresponding to PCT/JP2013/004979 dated Nov. 19, 2013 (one page).

Japanese Office Action issued by the Japan Patent Office for Japanese Application No. 2014-540723 dated Aug. 8, 2017 (6 pages).

* cited by examiner

POWER TRANSMITTING/RECEIVING 304
DEVICE INFORMATION TABLE

| NUMBER | ID OF POWER TRANSMITTING/ RECEIVING DEVICE WHICH TRANSMITS ELECTRIC POWER | ID OF POWER TRANSMITTING/ RECEIVING DEVICE WHICH RECEIVES ELECTRIC POWER | POWER SUPPLY OF POWER TRANSFERRING SOURCE | MINIMUM AMOUNT OF POWER TO BE TRANSMITTED [kWh] | MAXIMUM AMOUNT OF POWER TO BE TRANSMITTED [kWh] |
|---|---|---|---|---|---|
| 1 | xxx | bbb | SUNLIGHT | 50 | 100 |
| 2 | yyy | ddd | THERMAL POWER | 200 | 300 |
| 3 | zzz | bbb | NUCLEAR POWER | 100 | 120 |
| ... | ... | ... | ... | ... | ... |

Fig. 4

PRIORITY MANAGEMENT TABLE 305

| PRIORITY | TYPE | DETAILS |
|---|---|---|
| 1 | DISPERSED | SUNLIGHT, WIND, ..... |
| 2 | FIXED | WATER, ..... |
| 3 | FIXED | OIL, COAL, ..... |
| ... | ... | ... |

Fig. 5

POWER INTERCHANGE SYSTEM, POWER
TRANSMITTING/RECEIVING DEVICE,
POWER INTERCHANGE METHOD, AND
PROGRAM

CROSS-REFERENCE TO RELATED
APPLICATIONS

This application is a national stage application of International Application No. PCT/JP2013/004979 entitled "Power Interchange System, Power Transmitting/Receiving Device, Power Interchange Method, and Program," filed on Aug. 23, 2013, which claims the benefit of the priority of Japanese Patent Application No. 2012-224126, filed on Oct. 9, 2012, the disclosures of each of which are hereby incorporated by reference in their entirety.

TECHNICAL FIELD

The present invention relates to a power interchange system, a power transmitting/receiving device, a power interchange method, and a program.

BACKGROUND ART

Power interchange that transfers electric power from one location to another location is required to adjust an electric power supply and demand balance. Patent literature 1 discloses classifying each power-receiving facility into a plurality of groups under a condition such as a power consumption pattern and interchanging a margin electric power among the groups.

When power interchange is performed, a power loss occurs due to a resistance in a power transmission line or AC/DC conversion, for example. While it is possible to reduce the loss to some extent by performing high-voltage power transmission or improving power conversion efficiency, it is difficult to completely eliminate the loss. When a demand side requests a certain amount of electric power, a supply side needs to provide electric power in consideration of the power that will be lost.

CITATION LIST

Patent Literature

Patent Literature 1: Japanese Unexamined Patent Application Publication No. 2003-32887

SUMMARY OF INVENTION

Technical Problem

The present inventors have considered that it is important to preferentially utilize a suitable power supply when power interchange is performed in order to stably supply energy while compensating for a power loss.

Object of the Present Invention

An exemplary object of the present invention is to provide a power interchange system, a power transmitting/receiving device, a power interchange method, and a program to preferentially utilize a suitable power supply when power interchange is performed.

Solution to Problem

A power interchange system according to the present invention includes: a power transmitting/receiving device arranged for each electric power system and transmitting electric power from one electric power system to another electric power system via a power transmission line; and a controller that is connected to the power transmitting/receiving device via a communication line; in which: the controller includes: signal sending/receiving means for receiving information regarding the power transmitting/receiving device from the power transmitting/receiving device; power transmitting/receiving device information storage means for storing the information regarding the power transmitting/receiving device; priority information storage means for storing a priority of a power supply in the electric power system; and information control means for determining, based on the information regarding the power transmitting/receiving device and the priority of the power supply, an amount of power to be transmitted and the power transmitting/receiving device which is to transmit electric power, and creating, based on the determination, a control instruction to make the power transmitting/receiving device transmit electric power, the signal sending/receiving means transmits the control instruction to at least the power transmitting/receiving device which is to transmit electric power, the power transmitting/receiving device transmits electric power according to the control instruction, and the power interchange system transfers electric power between a plurality of the electric power systems.

A power transmitting/receiving device according to the present invention is arranged for each electric power system and transmits electric power from one electric power system to another electric power system via a power transmission line, in which: a controller connected to the power transmitting/receiving device via a communication line includes: signal sending/receiving means for receiving information regarding the power transmitting/receiving device from the power transmitting/receiving device; power transmitting/receiving device information storage means for storing the information regarding the power transmitting/receiving device; priority information storage means for storing a priority of a power supply in the electric power system; and information control means for determining, based on the information regarding the power transmitting/receiving device and the priority of the power supply, an amount of power to be transmitted and the power transmitting/receiving device which is to transmit electric power, and creating, based on the determination, a control instruction to make the power transmitting/receiving device transmit electric power, and the power transmitting/receiving device transmits electric power according to the control instruction transmitted from the signal sending/receiving means.

A controller according to the present invention is connected to a power transmitting/receiving device via a communication line, the power transmitting/receiving device being arranged for each electric power system and transmitting electric power from one electric power system to another electric power system via a power transmission line, the controller including: signal sending/receiving means for receiving information regarding the power transmitting/receiving device from the power transmitting/receiving device; power transmitting/receiving device information storage means for storing the information regarding the power transmitting/receiving device; priority information storage means for storing a priority of a power supply in the electric power system; and information control means for determining, based on the information regarding the power transmitting/receiving device and the priority of the power supply, an amount of power to be transmitted and the power transmitting/receiving device which is to transmit electric power, and creating, based on the determination, a control instruction to make the power transmitting/receiving device transmit electric power, in which the signal sending/receiving means further transmits the control instruction to the power transmitting/receiving device.

A power interchange method according to the present invention includes: acquiring information regarding a power transmitting/receiving device arranged for each electric power system and transmitting electric power from one electric power system to another electric power system via a power transmission line; acquiring priority information of a power supply in the electric power system; determining, based on the information regarding the power transmitting/receiving device and the priority of the power supply, an amount of power to be transmitted and the power transmitting/receiving device which is to transmit electric power; instructing, based on the determination, the power transmitting/receiving device to transmit electric power; and the power transmitting/receiving device transmits electric power according to the instruction.

A non-transitory computer readable medium according to the present invention stores a program that causes a computer to serve as a device that manages power interchange between a plurality of electric power systems, in which when a power transmitting/receiving device that transmits electric power from one electric power system to another electric power system via a power transmission line is arranged for each of the electric power systems, the program gives the computer the following functions of: a receiving function to receive information regarding the power transmitting/receiving device; a power transmitting/receiving device information acquisition function to acquire the information regarding the power transmitting/receiving device; a priority information acquisition function to acquire a priority of a power supply in the electric power system; a function of determining, based on the information regarding the power transmitting/receiving device and the priority of the power supply, an amount of power to be transmitted and the power transmitting/receiving device which is to transmit electric power, and creating, based on the determination, a control instruction to make the power transmitting/receiving device transmit electric power; and a function of transmitting the control instruction to at least the power transmitting/receiving device which is to transmit electric power.

Advantageous Effects of Invention

According to the present invention, it is possible to preferentially transfer power from a suitable power supply when power interchange is performed.

BRIEF DESCRIPTION OF DRAWINGS

FIG. 4 is a diagram showing a configuration of a power transmitting/receiving device information table 304 according to the exemplary embodiment of the present invention;

FIG. 5 is a diagram showing a configuration of a priority management table 305 according to the exemplary embodiment of the present invention;

DESCRIPTION OF EMBODIMENTS

Figure 1:
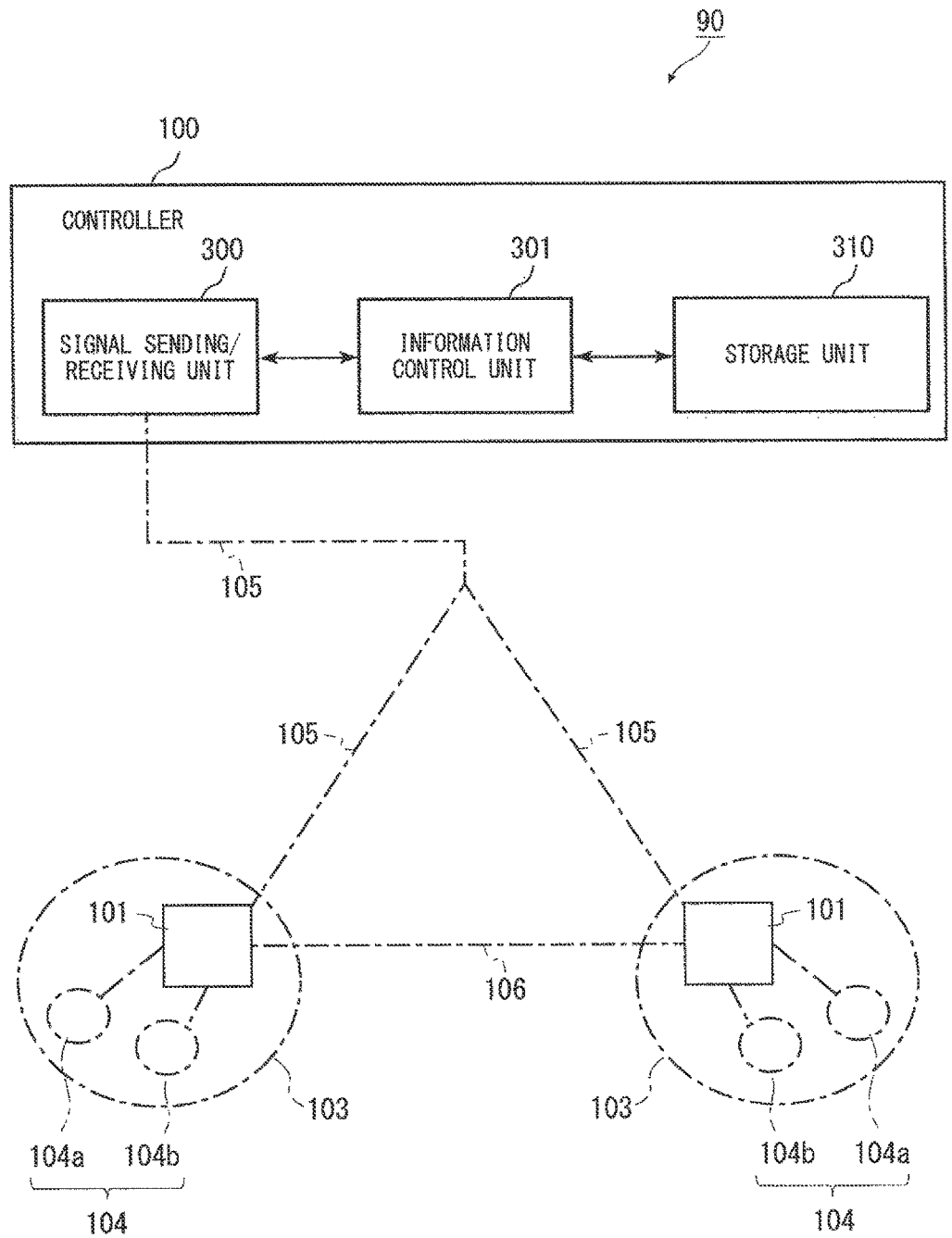
FIG. 1 is a diagram showing a power interchange system according to an exemplary embodiment of the present invention.

Hereinafter, exemplary embodiments of the present invention will be described in detail.

As described above, it is considered that it is important to preferentially utilize a suitable power supply when power interchange is performed (or power is transferred as necessary). In the following exemplary embodiments, it can be understood that the term "priority" is the degree indicating whether each power supply in the electric power system is suitable as a power supply used to compensate for a power loss.

In the following exemplary embodiments, whether each power supply is "suitable" may depend on whether each power supply is "a power supply whose output can be easily adjusted", "an environmentally-friendly power supply", or "a renewable energy". However, whether each power supply is "suitable" is not determined based on only the points stated above.

First, the basic configuration of a power interchange system according to the exemplary embodiments will be described. A power interchange system 90 shown in FIG. 1 performs the interchange of electric power (or transferring electric power as necessary) between a plurality of electric power systems 103 (between electric power systems). The power interchange system 90 includes a power transmitting/receiving device 101. The power transmitting/receiving device 101 is provided for each electric power system 103. The power transmitting/receiving device 101 transmits electric power from one electric power system 103 to another electric power system 103 via a power transmission line 106. A controller 100 is connected to the power transmitting/receiving devices 101 via communication lines 105.

The controller 100 includes a transmitting/receiving unit 300, which is one exemplary aspect of signal sending/receiving means. The transmitting/receiving unit 300 receives information regarding each of the power transmitting/receiving devices 101 from each of the power transmitting/receiving devices 101. The controller 100 further includes a storage unit 310.

Figure 3:
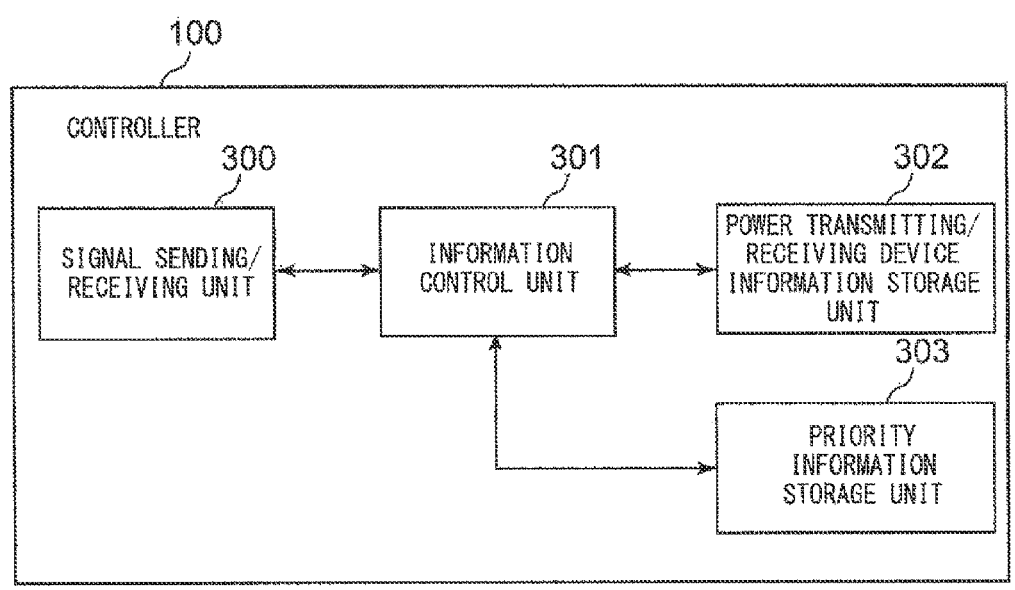
FIG. 3 is a diagram showing a configuration of a controller 100 according to the exemplary embodiment of the present invention.

As shown in FIG. 3, the storage unit 310 may be divided into a power transmitting/receiving device information storage unit 302 and a priority information storage unit 303. The power transmitting/receiving device information storage unit 302 is one exemplary aspect of power transmitting/receiving device information storage means. The priority information storage unit 303 is one exemplary aspect of priority information storage means. The storage unit 310 stores power transmitting/receiving device information and priority information.

The power transmitting/receiving device information relates to each power transmitting/receiving device 101. The power transmitting/receiving device information has a form, for example, like a power transmitting/receiving device information table 304 shown in FIG. 4 described later. The priority information relates to the priority of each power supply in each of the electric power systems 103. The power supply is, for example, a load 104a or a power generation device 104b in the power generation device 104b shown in FIG. 3. The priority information has a form, for example, like a priority management table 305 shown in FIG. 5 described later.

The controller 100 further includes an information control unit 301, which is one exemplary aspect of information control means. The information control unit 301 selects or determines, based on the power transmitting/receiving device information and the priority information, the power transmitting/receiving device 101 which is to transmit electric power. Further, the information control unit 301 determines the amount of power to be transmitted from the power transmitting/receiving device 101. The information control unit 301 further creates, based on the determination, a control instruction to make the power transmitting/receiving device 101 perform power transmission. The control instruction includes information on the amount of power to be transmitted. The transmitting/receiving unit 300 further transmits the control instruction to the power transmitting/receiving device that is selected or determined.

First Exemplary Embodiment

Figure 2:
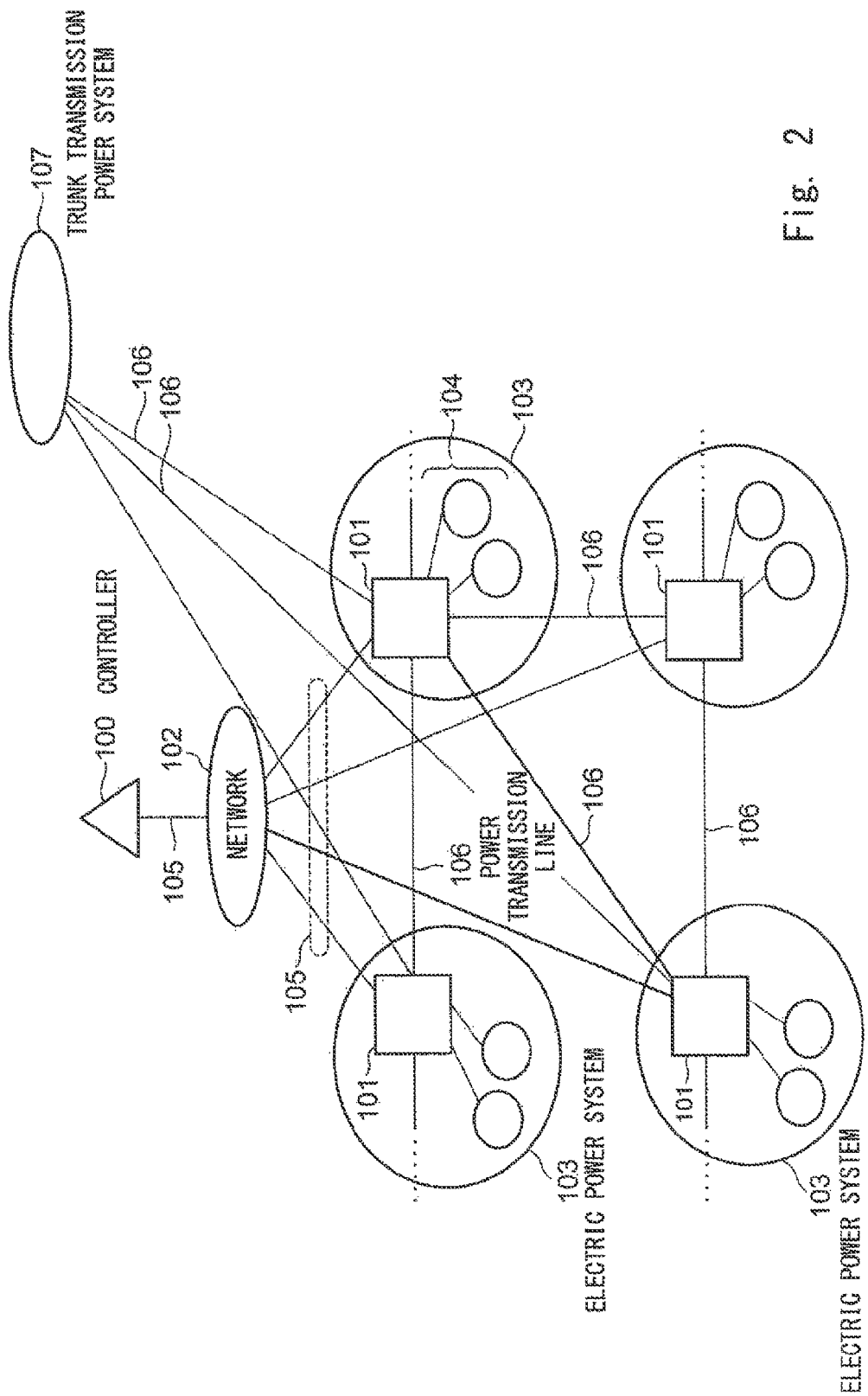
FIG. 2 is a diagram showing a power network and a communication network according to the exemplary embodiment of the present invention.

First, a first exemplary embodiment of the present invention will be described. Referring to FIG. 2, a power interchange system according to the first exemplary embodiment of the present invention includes a controller 100, a network 102, electric power systems 103, power transmitting/receiving devices 101, communication lines 105, and power transmission lines 106.

The controller 100 is a computer that can have a function according to a power interchange method according to this exemplary embodiment by a predetermined program control. The controller 100 manages information including contents of power transmission and power reception in each power transmitting/receiving device 101, device information on each power transmitting/receiving device 101, a power generation device which is in the electric power system 103 in which the power transmitting/receiving device is arranged, and a power supply such as a battery. The controller 100 determines, when power is to be transferred, the power transmitting/receiving device which is to transmit electric power, the power transmitting/receiving device which is to receive electric power, and the amount of power to be transmitted.

The electric power system 103 includes a set of customers who use electric power. The electric power system 103 is a region in which properties of power such as a frequency are the same. The power transmitting/receiving device 101 connects electric power systems 103 having different properties.

The electric power system 103 is connected to a trunk transmission power system 107 managed by an electric power company in one exemplary aspect, and receives electric power from the trunk transmission power system 107. Further, the electric power system 103 includes a power generation device, a power supply 104 such as a battery or a load 104. The power generation device 104 supplies electric power to the electric power system 103.

Further, the electric power system 103 is also able to adjust an electric power supply and demand independently from the trunk transmission power system 107 by receiving electric power from another electric power system 103. Further, the electric power system 103 transfers electric power to another electric power system 103 by sending electric power to the other electric power system 103.

The power transmitting/receiving device 101 is arranged in each electric power system 103. The power transmitting/receiving device 101 transmits a specified amount of electric power to one or more other power transmitting/receiving devices 101 according to an instruction from the controller 100. Alternatively, such an instruction on the amount of power may be given to each power transmitting/receiving device 101 which is to receive electric power. Alternatively, power is transmitted and received within the electric power system 103. The power transmitting/receiving device 101 may manage the status of electric power supply and demand of the electric power system 103.

The network 102 is an information infrastructure which is used to exchange information between the controller 100 and the power transmitting/receiving device 101. The network 102 is, for example, the Internet, and the communication line 200 is, for example, formed of an optical cable or a twisted pair cable.

The communication line 105 connects the controller 100 and the power transmitting/receiving device 101 via the network 102. The power transmission line 106 connects the power transmitting/receiving devices 101 to transmit electric power. Further, the power transmission line 106 supplies electric power from the trunk transmission power system 107 to the electric power system 103.

FIG. 3 is a diagram for describing the details of the configuration of the controller 100. The controller 100 includes a transmitting/receiving unit 300, an information control unit 301, a power transmitting/receiving device information storage unit 302, and a priority information storage unit 303.

The transmitting/receiving unit 300 receives information regarding the power transmitting/receiving device 101 from the power transmitting/receiving device 101. The transmitting/receiving unit 300 then transfers the information regarding the power transmitting/receiving device to the information control unit 301. Further, the transmitting/receiving unit 300 transmits the control instruction received from the information control unit 301 to the power transmitting/receiving device 101.

The information control unit 301 analyzes the information received from the transmitting/receiving unit 300. The information control unit 301 registers the information in the power transmitting/receiving device information storage unit 302 or deletes information therein according to the contents of the received information.

Further, the information control unit 301 determines the power transmitting/receiving device which is to transmit electric power, the power transmitting/receiving device which is to receive electric power, and the amount of power to be transmitted. To make such a determination, the information control unit 301 refers to the information stored in the power transmitting/receiving device information storage unit 302 and the priority information storage unit 303. The information control unit 301 then creates the control instruction to instruct the power transmitting/receiving device 101 to transmit electric power, and transmits the control instruction to the transmitting/receiving unit 300. The details of the operation of the information control unit 301 will be described later.

The power transmitting/receiving device information storage unit 302 stores device information and statistical information of the power transmitting/receiving device 101 which is controlled by the power transmitting/receiving device information storage unit 302. FIG. 4 shows a configuration example of the power transmitting/receiving device information table 304 held by the power transmitting/receiving device information storage unit 302.

The power transmitting/receiving device information table 304 includes a set of rows for each power transmission task of the power transmitting/receiving device 101. Each row includes items such as the device number of the power transmitting/receiving device 101 which is to transmit electric power, the device number of the power transmitting/receiving device 101 which is to receive electric power, the type of the power generation device (power supply) of the power transferring source (or power transmission source), and the maximum amount of power that can be transmitted and the minimum amount of power that can be transmitted.

When the power transmitting/receiving device which is to transmit electric power and the power transmitting/receiving device which is to receive electric power are the same, a plurality of power transmission paths may exist. This case includes, for example, a case in which there are one or more power transmitting/receiving devices between the power transmitting/receiving device which transmits electric power and the power transmitting/receiving device which is to receive electric power. In such a case, the power transmission task may be different for each power transmission path.

The priority information storage unit 303 manages the priority of the power generation device. FIG. 5 shows a configuration example of the priority management table 305 managed by the priority information storage unit. The priority management table 303 includes a set of rows for each priority. Each row in the priority management table 303 includes items of the priority number and the type of the power generation device (power supply).

In the priority management table 303, the information control unit 301 sets priority orders so that a higher priority level is given to a smaller number, for example. The information control unit 301 may set a plurality of priority orders for one number.

The information control unit 301 may fix the contents of the tables. The information control unit 301 may register information in the table or delete information in the table according to the situation. The information control unit 301 sets, for example, the priority based on the type of the power supply, the amount of power that can be generated, and the cost.

The power transmitting/receiving device information storage unit 302 and the priority information storage unit 303 may be provided outside of the controller. In such a case, the controller acquires the power transmitting/receiving device information and the priority information from the power transmitting/receiving device information storage unit and the priority information storage unit provided outside of the controller.

The power transmitting/receiving devices 101 have version numbers different from one another depending on the elements that form the device. The power interchange system, the controller 100, the transmitting/receiving unit 300, the information control unit 301, the power transmitting/receiving device information storage unit 302, and the priority information storage unit 303 are able to differentiate the power transmitting/receiving devices 101 from each other by the version numbers. The power transmitting/receiving devices 101 having the same configuration may have the same version number.

When transmitting power, each of the power transmitting/receiving device 101 carries out power conversion. In this case, the controller 100 and the like are able to know the power loss when power is converted from each power transmitting/receiving device 101 or the version number of the device. Further, the power transmitting/receiving devices 101 each have a device number as the information to differentiate them from the other power transmitting/receiving devices 101.

Figure 6:
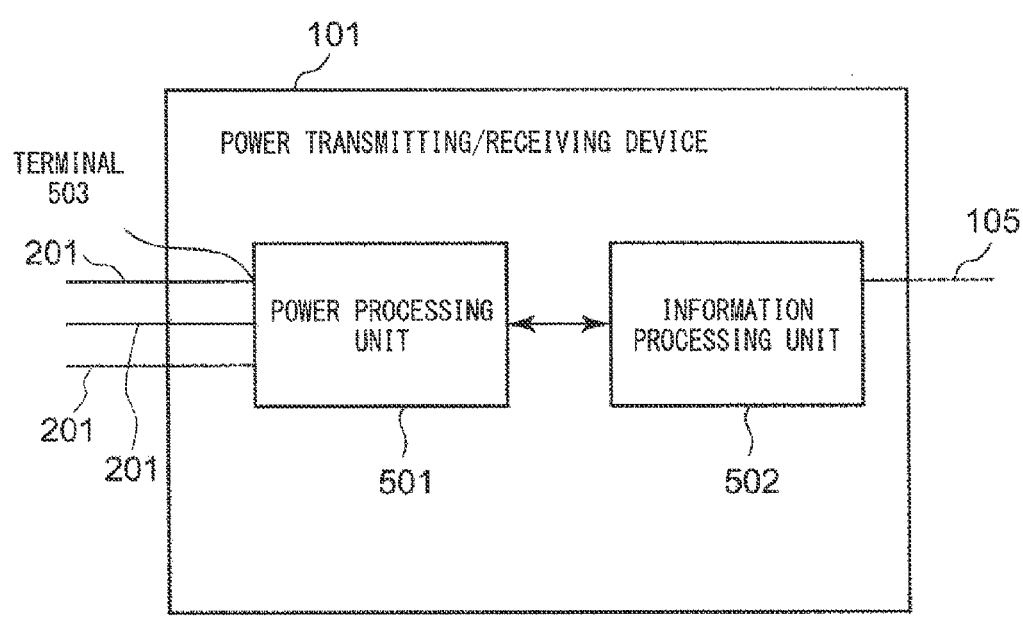
FIG. 6 is a diagram showing a configuration of a power transmitting/receiving device 101 of the present invention.

FIG. 6 shows a configuration example of the power transmitting/receiving device 101. The power transmitting/receiving device includes a power processing unit 501 and an information processing unit 502. The power processing unit is connected to another power transmitting/receiving device 101, the power generation device or the load 104 via the power transmission line 106. The power processing unit 501 performs power transmission and power reception inside the electric power system or between the electric power systems according to the contents of the control instruction received from the controller.

When electric power is being transmitted to or received from a different electric power system, the power processing unit 501 adjusts output of the frequency or the voltage. The power processing unit 501 considers the following elements when adjusting the output: power transmission capacity of the power transmission line 106 between the power transmitting/receiving devices 101, the amount of power that can be transmitted from the electric power system 103, and the type of power supply of the power transferring source, etc. Further, the power processing unit 501 sends information such as the amount of power to be transmitted or the power transferring destination (or power transmission destination) to the information processing unit 502.

The information processing unit 502 is connected to the controller via a communication line and receives a control instruction from the controller. The information processing unit 502 instructs the power processing unit to transmit electric power based on the contents of the control instruction.

Further, the information processing unit 502 is connected to the network 102 by the communication line 200. The information processing unit 502 sends information, such as the device number or the version number of the power transmitting/receiving device 101, and the information received from the power processing unit 501 to the controller 100.

Further, the power transmitting/receiving device 101 may manage the status of the electric power supply and demand of the electric power system 103. More specifically, the power transmitting/receiving device 101 manages the state of the load and the state of power generation of the power generation device and controls the adjustment of supply and demand of the electric power.

Figure 7:
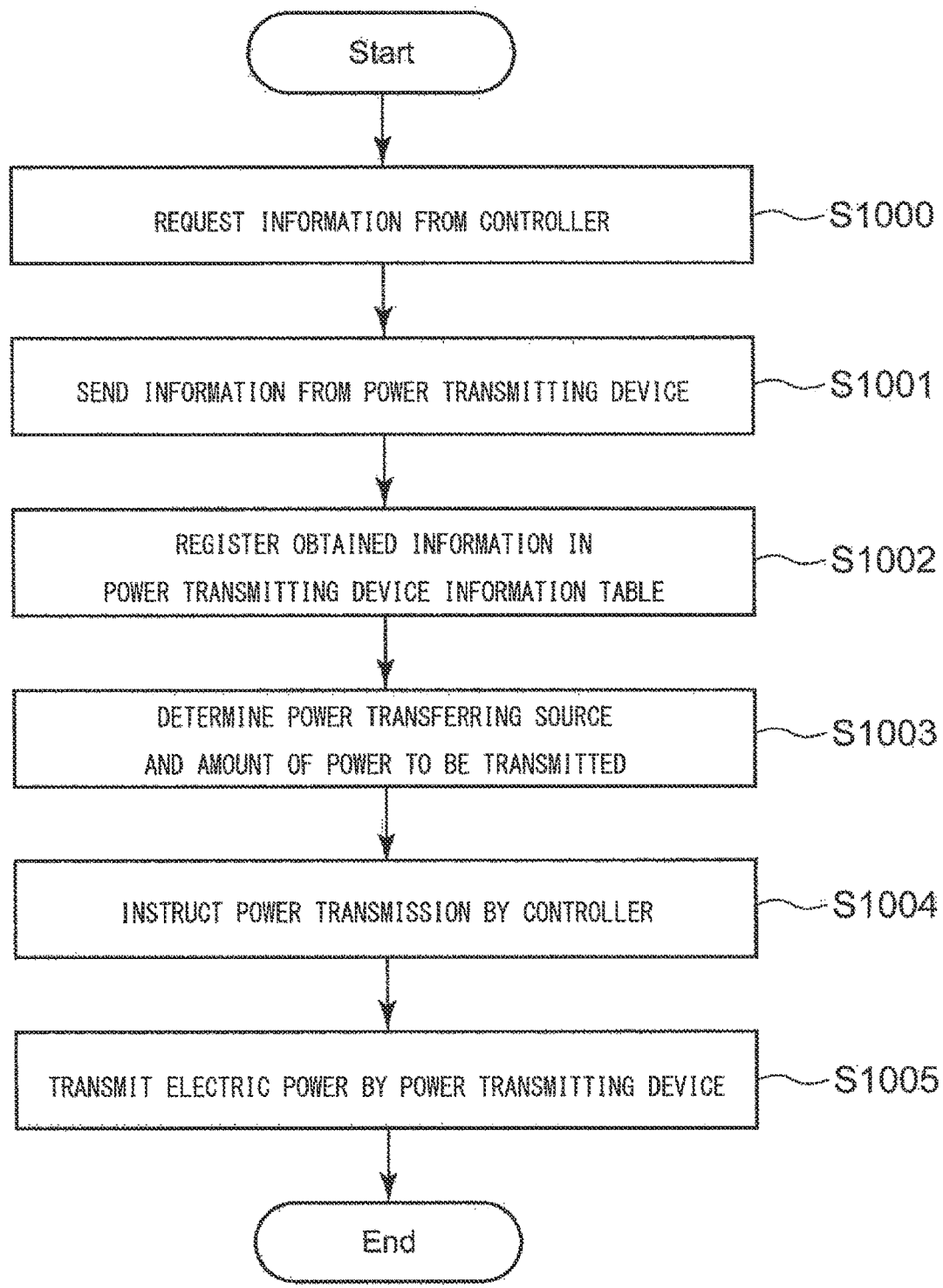
FIG. 7 is an operation flow of the whole system according to the exemplary embodiment of the present invention.

FIG. 7 is a flowchart showing operations of the whole system. These operations will be described below in order.

Step S1000: the controller requests the power transmitting/receiving device for information. Specifically, the controller 100 requests the power transmitting/receiving device 101 which is the demander of electric power to send the signal of the "necessary amount of power to be transferred (or transmitted)".

The controller 100 requests each power transmitting/receiving device 101 which is the supplier of electric power to send the signals of "the device number of the power transmitting/receiving device 101 which is to transmit electric power", "the device number of such device which is to receive electric power", "type of power transferring source", "minimum amount of power to be transmitted", and "maximum amount of power to be transmitted" from each power transmitting/receiving device 101.

Alternatively, the power transmitting/receiving device 101 which is the demander of electric power may request the controller 100 for transferring (or transmitting) of the necessary amount of power to be transferred based on the electric power supply and demand of each electric power system 103. When, for example, electric power in the electric power system 103 is not sufficient (shortage of electric power), the power transmitting/receiving device 101 which is the demander of electric power may request the controller 100 for transferring of the necessary amount of power to be transferred (request for transferring).

Step S1001: the power transmitting/receiving device sends information to the controller. Specifically, the power transmitting/receiving device 101 as shown in FIGS. 1 and 3 sends the information which is requested to the controller 100.

Step S1002: the controller registers the information of the power transmitting/receiving device in the power transmitting/receiving device information table. More specifically, the controller 100 as shown in FIGS. 1 and 3 registers the information received from the power transmitting/receiving device 101 in the power transmitting/receiving device information table 304 as shown in FIG. 4.

Step S1003: the controller 100 as shown in FIGS. 1 and 3 determines the power transmitting/receiving device which is to transmit electric power and the amount of power to be transmitted. The determination of the power transmitting/receiving device and the amount of power to be transmitted is performed in the information control unit 301 based on the necessary amount of power to be transferred, the information from the power transmitting/receiving device information storage unit 302, and the information from the priority information storage unit 303.

Step S1004: the controller instructs each power transmitting/receiving device to transmit electric power. Specifically, the controller 100 as shown in FIGS. 1 and 3 creates, based on the determination, the control instruction including the power transmitting/receiving device which is to receive electric power, the power transmitting/receiving device which is to transmit electric power, and the amount of power to be transmitted. The controller 100 further sends the control instruction to each power transmitting/receiving device 101.

Step S1005: each power transmitting/receiving device transmits electric power according to the instruction. Specifically, the power transmitting/receiving device 101 as shown in FIGS. 1 and 3 transmits a specified amount of electric power according to the control instruction to a specified power transmitting/receiving device.

Figure 8:
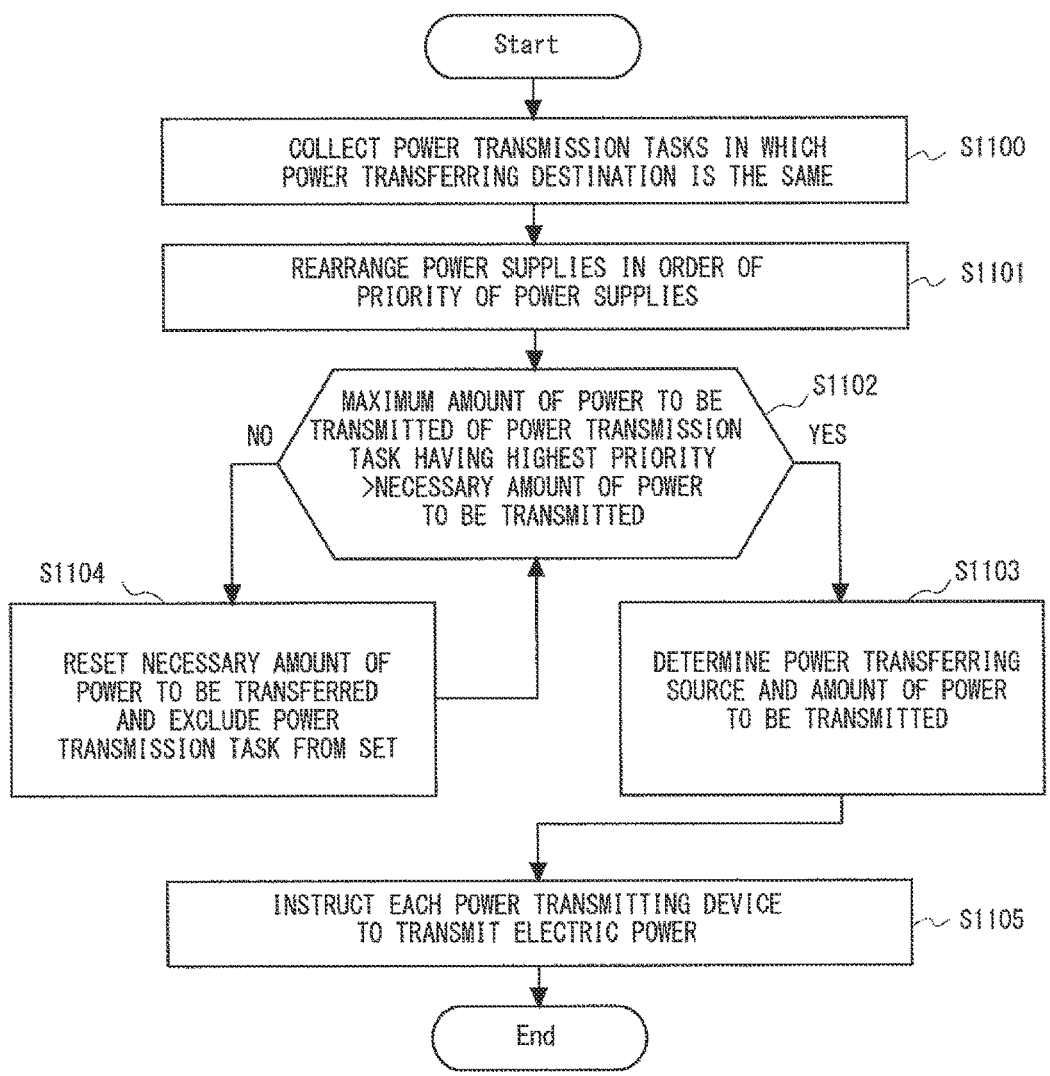
FIG. 8 is an operation flow of an information control unit 301 in the controller 100 according to the exemplary embodiment of the present invention.

FIG. 8 is a flowchart showing a processing series when the information control unit 301 determines each power transmitting/receiving device 101 which is to transmit electric power and the amount of power to be transmitted. The information control unit 301 determines the power transferring source and the amount of power to be transmitted for each power transmitting/receiving device 101 corresponding to a specific power transferring destination. FIG. 8 shows the details of Step S1003 shown in FIG. 7. The details will be described below in order.

In Step S1100, the information control unit collects the power transmission tasks in which the power transferring destination is the same from the power transmitting/receiving device information table. Specifically, the information control unit 301 as shown in FIGS. 1 and 3 acquires a set of rows whose "device number of the power transmitting/receiving device which is to receive electric power" is the same from the power transmitting/receiving device information table 304 shown in FIG. 4.

In Step S1101, the information control unit rearranges the order of the power supplies in an order of priority of power supplies. More specifically, the information control unit 301 as shown in FIGS. 1 and 3 refers to the "type of the power supply" in the row set acquired in Step S1100 and the priority management table 305 as shown in FIG. 5. Further, the information control unit 301 rearranges the row set in the priority management table 305 in a descending order of priority of power supplies.

When there are power supplies having the same priority, the information control unit 301 determines the order of priority of the power supplies by referring to other factors. For example, the information control unit 301 determines the order of priority of the power supplies by taking into consideration the amount of power to be transmitted and the power loss.

In Step S1102, it is determined by the information control unit whether the expression (necessary amount of power to be transferred)<(amount of power generation of the power transmission task whose priority is the highest) is satisfied. More specifically, the information control unit 301 as shown in FIGS. 1 and 3 checks whether the maximum amount of power to be transmitted of the power transmission task whose priority is the highest is larger than the necessary amount of power to be transferred. When the maximum amount of power to be transmitted is larger than the necessary amount of power to be transferred, the processing goes to Step S1103. When the maximum amount of power to be transmitted is smaller than the necessary amount of power to be transferred, the processing goes to Step S1104.

In Step S1103, the information control unit determines the power transmitting/receiving device of the power transmission task whose priority is the highest as the power transferring source and the maximum amount of power to be transmitted as the amount of power to be transmitted. More specifically, the information control unit 301 shown in FIGS. 1 and 3 determines the power transmitting/receiving device of the power transmission task whose amount of power generation is compared to the necessary amount of power to be transferred in S1102 as the power transferring source. Further, the information control unit 301 determines the necessary amount of power to be transferred as the amount of power to be transmitted. In Step S1105, the information control unit 301 instructs each of the power transmitting/receiving devices to transmit electric power.

In Step S1104, the information control unit 301 sets the amount of power obtained by subtracting the maximum amount of power of the power transmitting/receiving device whose priority is the highest from the necessary amount of power to be transferred as a necessary amount of power to be transferred. Then the information control unit 301 excludes the power transmission task whose priority is the highest from the set described in Step S1100. The processing then goes back to Step S1102, where the information control unit 301 compares the necessary amount of power to be transferred with the maximum amount of power to be transmitted of the power transmission task whose priority is the highest.

The power interchange system is operated as stated above. Accordingly, in the first exemplary embodiment, the power interchange system is able to perform power interchange based on the priority set according to the type of the power supply.

Second Exemplary Embodiment

In a second exemplary embodiment, a power interchange system sets the priority orders in the priority management table 305 in consideration of whether a power generation device which is a power supply is renewable energy. The configurations of the other parts of this embodiment are similar to those of the first exemplary embodiment, and thus the descriptions thereof will be omitted.

When the power generation device managed by the power transmitting/receiving device 101 uses renewable energy such as sunlight, wind, water, geothermal, and biomass, the power interchange system sets a higher priority level for these systems.

More specifically, the information control unit 301 registers the priority of the power supply using renewable energy in the priority management table 305 as a priority 1. Based on this, the information control unit 301 determines the power transferring source for power interchange according to the flow shown in FIG. 8.

It is therefore possible for the power interchange system to preferentially transfer electric power based on the power supply using renewable energy. The power interchange system may set another priority according to the type of renewable energy.

Third Exemplary Embodiment

A third exemplary embodiment is different from the above exemplary embodiments in that a power interchange system determines the power transferring source and the amount of power to be transmitted based on the priority of each power supply and the amount of power that can be transmitted of the power transmission task in the third exemplary embodiment.

In the third exemplary embodiment, a set of power transmission tasks includes the information regarding the power transmitting/receiving device 101 shown in FIG. 1. As shown in FIG. 4, the set of power transmission tasks includes the power transmitting/receiving device 101 which is to receive electric power, the power transmitting/receiving device 101 which is to transmit electric power, the power supply of the power transferring source (i.e., power generation device 104b), and the maximum and minimum amount of power that can be transmitted.

In the power interchange system 90 shown in FIG. 1, the information control unit 301 shown in FIG. 1 determines the power transmitting/receiving device 101 which is to transmit electric power and the amount of power to be transmitted. Such a determination is based on both or at least one of the maximum amount of power to be transmitted and the minimum amount of power to be transmitted shown in FIG. 4.

When there are a plurality of tasks having the same priority order in Step S1101 in FIG. 8, the power interchange system takes into consideration the minimum amount of power to be transmitted and the maximum amount of power to be transmitted of the power transmitting/receiving device information table 304.

In order to reduce the number of power transferring sources, for example, the power interchange system selects the task whose maximum amount of power is larger than that of other tasks, and sets the maximum amount of power to be transmitted of the task as the amount of power to be transmitted. When the amount of power to be transmitted is less than the requested amount, the power interchange system further selects, in addition to the above task, the task whose maximum amount of power is larger than that of the other tasks, combines these tasks, and determines these tasks as the power transferring source. According to the third exemplary embodiment, it is thus possible to improve the power transmission efficiency.

On the other hand, in order to increase the number of power transferring sources, the power interchange system is able to select and combine a plurality of tasks whose minimum amount of power is small. Alternatively, the power interchange system may determine the power transferring source so that all the tasks whose priority is the same are selected. In this way, the power transferring source can be dispersed, whereby the power interchange system is able to carry out power interchange more securely.

Fourth Exemplary Embodiment

A fourth exemplary embodiment is different from the above exemplary embodiments in that the power transferring source and the amount of power to be transmitted are determined in consideration of a time during which power transmission is needed and the priority of each power supply. The information regarding the power transmitting/receiving device 101 shown in FIG. 4 further includes a time during which the power transmitting/receiving device 101 which is a candidate for the power transferring source can transmit electric power (not shown).

The information control unit 301 shown in FIG. 1 compares a time during which power interchange is needed included in the request from the power transmitting/receiving device 101 which is a candidate of the power transferring destination with a time during which power can be transmitted. The information control unit 301 determines the power transmitting/receiving device 101 which is to transmit electric power based on the above comparison.

In Step S1000 shown in FIG. 7, the controller 100 requests the power transmitting/receiving device 101 which is the demander of electric power to send the signals of the "necessary amount of power to be transferred" and the time during which power transmission is needed (request time) from the power transmitting/receiving device 101.

The request time is, for example, a predetermined length of time during which power transmission to the electric power system 103 of the demander is required, and starts from a predetermined time. The predetermined time may either be constant or be varied depending on the situation. The predetermined length of time may either be constant or be varied depending on the situation.

The controller 100 requests each power transmitting/receiving device 101 which is the supplier of electric power to send the signals of the "time during which power can be transmitted" together with the power transmitting/receiving device information from the power transmitting/receiving device 101. The time during which power can be transmitted is a predetermined length of time during which the electric power system 103 of the supplier of electric power can transmit electric power and starts from a predetermined time. The predetermined time may either be constant or be varied depending on the situation. The predetermined length of time may either be constant or be varied depending on the situation.

In Step S1002, the controller 100 registers the information received from the power transmitting/receiving device 101 which is the demander of electric power and/or the supplier of electric power in the power transmitting/receiving device information table 304. In Step S1003, the information control unit 301 of the controller 100 determines the power transferring source and the amount of power to be transmitted.

The determination of the power transferring source and the amount of power to be transmitted is based on the necessary amount of power to be transferred, the request time, and the information from the power transmitting/receiving device information storage unit 302 and the priority information storage unit 303. More specifically, in Step S1101 in FIG. 8, after the row sets are rearranged in a descending order of priority of power supplies, a power transmitting/receiving device which is to transmit electric power is determined as the power transferring source, in which the request time falls within the time during which power can be transmitted from the power transmitting/receiving device.

In Step S1105, the controller 100 further specifies the power transmission time in addition to the power transferring source and the amount of power to be transmitted to create the control instruction. The power transmitting/receiving device transmits electric power at the time specified according to the control instruction.

According to the fourth exemplary embodiment, the electric power system or each power transmitting/receiving device 101 is able to transmit or receive the required amount of electric power at the time during which power is required. Accordingly, the power interchange system is able to carry out power interchange more finely.

Fifth Exemplary Embodiment

A power transmitting/receiving device information table 304 of a power interchange system according to a fifth exemplary embodiment is different from the power transmitting/receiving device information table 304 according to the first exemplary embodiment in that a "unit cost for power generation" is added. In such a power interchange system, the "unit cost for power generation" can be added to the power transmitting/receiving device information table 304 according to the first exemplary embodiment.

Such a power interchange system corrects the unit cost for power generation by the "power supply" based on the priority management table 303. Such a power interchange system determines the power transmission priority in an ascending order of unit cost for power generation.

For example, such a correction may be carried out to reduce the unit cost of the renewable energy. Accordingly, even when the unit cost of the renewable energy is higher than that of other power supplies, a high priority is given to the renewable energy and the power interchange system is able to determine the use of renewable energy.

It is therefore possible for the power interchange system to preferentially transfer electric power generated by the renewable energy. Further, the unit cost for power generation of an arbitrary power supply other than the renewable energy can be corrected or the priority of an arbitrary power supply other than the renewable energy can be adjusted, whereby more flexible operations can be performed.

Sixth Exemplary Embodiment

A power interchange system according to a sixth exemplary embodiment is a variation of the first exemplary embodiment. While the efficiency of the power conversion of the controller 100 is a fixed value in the first exemplary embodiment, the conversion efficiency according to the amount of power to be transmitted is calculated in the sixth exemplary embodiment. It is therefore possible to dynamically determine the efficiency of the power conversion for the information of the power generation amount sent as signal from the power transmitting/receiving device 101.

As stated above, according to the sixth exemplary embodiment, the controller is able to instruct each power transmitting/receiving device 101 to transmit the amount of power with high conversion efficiency. It is therefore possible for the power interchange system to perform power interchange more efficiently than the case in which transmission of the maximum amount of power is instructed.

Seventh Exemplary Embodiment

A power interchange system according to a seventh exemplary embodiment is a variation of the first exemplary embodiment. Each power transmitting/receiving device 101 holds information of a physical distance from an adjacent power transmitting/receiving device 101 in advance.

Each power transmitting/receiving device 101 further sends upon receiving an information request from the controller 100, the information required by the controller 100 together with other information. It is therefore possible for the controller 100 to estimate and calculate the power loss when power is transmitted between the power transmitting/receiving devices 101.

Alternatively, the power transmission distance may be registered in the power transmitting/receiving device information table 302 for each power transmission task.

As described above, according to the seventh exemplary embodiment, a power loss when power is transmitted can be taken into account in addition to the loss when power is converted, whereby it is possible to determine a more efficient power transmission priority.

Eighth Exemplary Embodiment

A power interchange system according to an eighth exemplary embodiment eliminates, when there is a sufficient amount of surplus power in the power transmitting/receiving device 101 having a higher priority order, an amount of power to be transmitted of the power transmitting/receiving device 101 having a lower priority order. Specifically, in Step S1102 in FIG. 8, the power interchange system rewrites the maximum amount of power to be transmitted of the power supply whose priority is low in a predetermined case.

The predetermined case is the case in which the maximum amount of power to be transmitted of the power transmission task whose priority is the highest is larger than the necessary amount of power to be transferred and the difference between them is equal to or larger than a certain value. The power interchange system rewrites the power transmission device information table 302 so that the maximum amount of power to be transmitted of the power supply other than the renewable energy is eliminated by a constant value.

According to the eighth exemplary embodiment, it is possible to further increase the utilization rate of the renewable energy and to suppress the utilization rate of the thermal power generation and the like.

While the present invention has been described above with reference to the exemplary embodiments, the present invention is not limited to the above exemplary embodiments. Various changes that can be understood by those skilled in the art may be made to the configuration and the details of the present invention within the scope of the present invention.

These are merely examples of the present invention and the configurations stated above may be combined or various other configurations than the configurations stated above may be employed. For example, the controller 100 may control the trunk transmission power system 107 in a way similar to the way it controls the electric power system 103 to perform power interchange.

For example, the controller 100 may transmit to each power transmitting/receiving device 101 a control instruction indicating the necessary amount of power to be transferred, the power transferring destination, and the priority of the power transmitting/receiving device which is to transmit electric power. In such a case, the power transmitting/receiving device 101 may determine the power transferring source.

Further, when there is a surplus power in the power transmitting/receiving device 101 that manages the power supply having a high priority, the power interchange system may perform control to distribute electric power from the power transmitting/receiving device to a plurality of other power transmitting/receiving devices.

Further, the power interchange system may not necessarily manage the power transmission device information table 304 by only the power transmitting/receiving device number. The power interchange system may register the power transmitting/receiving device number together with the terminal number of the power transmitting/receiving device. In this case, the power interchange system may specify the terminal of the power transmitting/receiving device to transmit electric power. It is therefore possible to control power transmission in a more flexible way and more accurately.

Further, the power interchange system may set the priority of each power supply in real time according to a state of power generation of each power supply. It is therefore possible for the power interchange system to perform power interchange with high accuracy depending on the state of power generation or an estimated amount of power generation each time.

In addition, the power supply can be replaced by a power storage device such as a primary battery or a secondary battery, not only by the power generation device.

Figure 9:
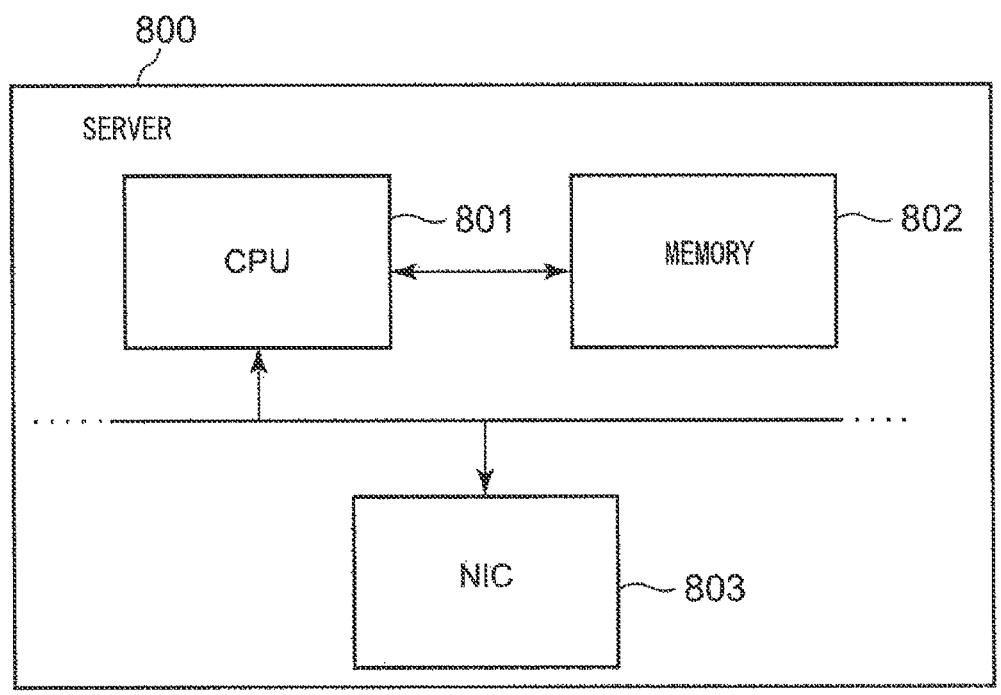
FIG. 9 is an example in which the controller 100 according to the exemplary embodiment of the present invention is implemented in an actual device.

FIG. 9 is a block diagram showing a hardware configuration example of the controller 100 as one example of various configurations according to this exemplary embodiment.

The controller 100 is implemented in one server 800. The server 800 includes a central processing unit (CPU) 801, a memory 802, and a network interface card (NIC) 803. The function of the controller 100 is achieved by the cooperation of the hardware and a computer program. More specifically, the CPU 801 implements the function of the information control unit 301, the memory 802 implements the function of the power transmitting/receiving device management table 302 and the priority management table 303, and the NIC 803 implements the function of the transmitting/receiving unit 300 of the controller 100.

The program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

The above program causes a computer represented by the server 800 to function as a device that manages power interchange among the plurality of electric power systems 103 shown in FIG. 1, or the controller 100. In one example of such a configuration, the power transmitting/receiving device 101 that transmits electric power from one electric power system 103 to another electric power system 103 through the power transmission line 106 is arranged for each electric power system 103.

The above program gives the computer a function of receiving information regarding the power transmitting/receiving device 101, i.e., a receiving function. The above program gives the computer a function of acquiring the information regarding the power transmitting/receiving device 101, i.e., a power transmitting/receiving device information acquisition function. The above program gives the computer a function of acquiring the priority of the power supply (power generation device 104*b*) in the electric power system 103, i.e., a priority information acquisition function.

The above program gives the computer a function of determining the power transmitting/receiving device 101 which is to transmit electric power and the amount of power to be transmitted based on the information regarding the power transmitting/receiving device 101 and the priority of the power supply. The above program gives the computer a function of creating the control instruction to make the power transmitting/receiving device 101 transmit electric power based on the above determination. The above program gives the computer a function of sending the control instruction to at least the power transmitting/receiving device 101 that transmits electric power.

[Related Art]

As described above, when the demand side requests a certain amount of electric power, the supply side needs to provide electric power in consideration of the loss. In order to compensate for such a loss and to stably supply energy, the power generation amount is adjusted by combining power supplies. This adjustment may be called "a best mix of power sources".

According to the best mix of power sources, a base power is, for example, water or nuclear power since the water and the nuclear power enable a stable output. On the other hand, thermal power generation, pumped-storage power generation and the like serve to adjust the electric power and supply the electric power according to the peak of the demand since the output of the thermal power generation, pumped-storage power generation and the like can be easily adjusted.

Meanwhile, in recent years, there has been a great demand for power generation using renewable energy such as sunlight, wind, water, geothermal, and biomass in consideration of a predicted depletion of fossil fuel, great concern for the environment and the like. In accordance therewith, the use of renewable energy has been promoted by legal measures by adjusting a purchase price of the renewable energy and reducing a burden on a user. Another system has been proposed to promote the use of renewable energy by adding, by Renewable Energy Certificates, an environmentally added value in addition to a value of electricity itself in the form of a certificate.

Currently, thermal power generation mainly bears the power loss. Among power supplies, thermal power generation puts a great burden on the environment and it is not desirable that the thermal power generation continues to bear the loss in terms of the predicted depletion of fossil fuel and great concern for the environment. This burden needs to be shared by other power supplies. In order to compensate for the burden on the thermal power generation, it is desirable to use a power supply which imposes less burden on the environment. Renewable energy can be an appropriate candidate for such a power supply.

However, the use of renewable energy has not been sufficiently promoted when power is interchanged. The aforementioned measures to promote the use of renewable energy require procedures such as adjustment of the purchase price, wheeling charge, and application and issuance of a certificate, which inhibits active utilization of the renewable energy.

This application is based upon and claims the benefit of priority from Japanese Patent Application No. 2012-224126, filed on Oct. 9, 2012, the disclosure of which is incorporated herein in its entirety by reference.

REFERENCE SIGNS LIST

90 POWER INTERCHANGE SYSTEM
100 CONTROLLER
101 POWER TRANSMITTING/RECEIVING DEVICE
102 NETWORK
103 ELECTRIC POWER SYSTEM
104 LOAD OR POWER GENERATION DEVICE
104a LOAD
104b POWER GENERATION DEVICE
105 COMMUNICATION LINE
106 POWER TRANSMISSION LINE
107 TRUNK TRANSMISSION POWER SYSTEM
300 SIGNAL SENDING/RECEIVING UNIT
301 INFORMATION CONTROL UNIT
302 POWER TRANSMITTING/RECEIVING DEVICE INFORMATION STORAGE UNIT
303 PRIORITY INFORMATION STORAGE UNIT
501 POWER PROCESSING UNIT
502 INFORMATION PROCESSING UNIT
800 SERVER
801 CPU
802 MEMORY
803 NIC

The invention claimed is:

1. A power interchange system for transferring power between a plurality of electric power systems comprising:
a plurality of power transmitting/receiving devices, each power transmitting/receiving device arranged for a respective electric power system of the plurality of electric power systems and transmitting electric power from one electric power system of the plurality of electric power systems to another electric power system of the plurality of electric power systems via a power transmission line; and
a controller that is connected to each power transmitting/receiving device of the plurality of power transmitting/receiving devices via a communication line; wherein:
the controller comprises:
memory for storing instructions; and
a processor configured to execute the instructions to:
receive information regarding each power transmitting/receiving device of the plurality of power transmitting/receiving devices from the respective power transmitting/receiving device;
store the information regarding the plurality of power transmitting/receiving devices and including a set of power transmission tasks, each task including the power transmitting/receiving device which is to receive electric power, the power transmitting/receiving device which is to transmit electric power, a power supply of a power transferring source, a maximum amount of power to be transmitted that can be transmitted, and a minimum amount of power to be transmitted that can be transmitted;
store a priority of at least one power supply in the plurality of electric power systems;
determine, based on the priority of the at least one power supply and both or at least one of the maximum amount of power to be transmitted and the minimum amount of power to be transmitted, an amount of power to be transmitted and which power transmitting/receiving device of the plurality of power transmitting/receiving devices is to transmit electric power;
create, based on the determination, a control instruction to make the power transmitting/receiving device, which is to transmit electric power, transmit electric power, and
send the control instruction to at least the power transmitting/receiving device, which is to transmit electric power, wherein
the power transmitting/receiving device, which is to transmit electric power, transmits electric power according to the control instruction,
each power transmitting/receiving device of the plurality of power transmitting/receiving devices manages a state of power supply and demand of the electric power system in which the respective power transmitting/receiving device is arranged, and
when power in the electric power system in which the respective power transmitting/receiving device is arranged is insufficient, each power transmitting/receiving device of the plurality of power transmitting/receiving devices sends to the controller a request indicating a necessary amount of power to be transferred which the respective power transmitting/receiving device requests transferring of.

2. The power interchange system according to claim 1, wherein the processor is configured to execute the instructions to set a higher priority level for a power supply that uses renewable energy, and store the higher priority level as the stored priority.

3. The power interchange system according to claim 1, wherein electric power is transmitted from one or more of the power transmitting/receiving devices to another one or more of the power transmitting/receiving devices according to the control instruction.

4. The power interchange system according to claim 1, wherein:
the information regarding each power transmitting/receiving device of the plurality of power transmitting/receiving devices comprises a unit cost for power generation of the power supply, and
the processor is configured to execute the instructions to correct the unit cost for power generation in consideration of whether the power supply uses renewable energy and set a higher priority level for the power supply based on the corrected unit cost for power generation.

5. The power interchange system according to claim 1, wherein:
the information regarding the plurality of power transmitting/receiving devices comprises a power loss when power is transmitted, and
the processor is configured to execute the instructions to determine, based on the power loss, the amount of power to be transmitted and which power transmitting/receiving device of the plurality of power transmitting/receiving devices is to transmit electric power.

6. The power interchange system according to claim 1, wherein:
the information regarding the plurality of power transmitting/receiving devices includes a time during which the power transmitting/receiving device, which is to transmit electric power, can transmit electric power, and
the processor is configured to execute the instructions to:
compare a time during which power transferring is needed included in the request from the respective power transmitting/receiving device with the time during which power can be transmitted, and
determine which power transmitting/receiving device of the plurality of power transmitting/receiving devices is to transmit electric power.

7. The power interchange system according to claim 1, wherein the processor is configured to execute the instructions to preferentially select a power transmission task in which the maximum amount of power to be transmitted is larger than that of other tasks to determine which power transmitting/receiving device of the plurality of power transmitting/receiving devices is to transmit electric power and the amount of power to be transmitted.

8. The power interchange system according to claim 1, wherein the request further indicates a time during which power transferring is needed.

9. A plurality of power transmitting/receiving devices, each power transmitting/receiving device arranged for a respective electric power system of a plurality of electric power systems and transmitting electric power from one electric power system of the plurality of electric power systems to another electric power system of the plurality of electric power systems via a power transmission line, wherein:
a controller connected to each power transmitting/receiving device of the plurality of power transmitting/receiving devices via a communication line comprises:
memory for storing instructions; and
a processor configured to execute the instructions to:
receive information regarding each power transmitting/receiving device of the plurality of power transmitting/receiving devices from the respective power transmitting/receiving device;
store the information regarding the plurality of power transmitting/receiving devices and including a set of power transmission tasks, each task including the power transmitting/receiving device which is to receive electric power, the power transmitting/receiving device which is to transmit electric power, a power supply of a power transferring source, a maximum amount of power to be transmitted that can be transmitted, and a minimum amount of power to be transmitted that can be transmitted;
store a priority of at least one power supply in the plurality of electric power systems; and
determine, based on the priority of the at least one power supply and both or at least one of the maximum amount of power to be transmitted and the minimum amount of power to be transmitted, an amount of power to be transmitted and which power transmitting/receiving device of the plurality of power transmitting/receiving devices which is to transmit electric power, and
create, based on the determination, a control instruction to make the power transmitting/receiving device, which is to transmit electric power, transmit electric power, wherein
the power transmitting/receiving device, which is to transmit electric power, transmits electric power according to the control instruction,
each power transmitting/receiving device of the plurality of power transmitting/receiving devices manages a state of power supply and demand of the electric power system in which the respective power transmitting/receiving device is arranged, and
when power in the electric power system in which the respective power transmitting/receiving device is arranged is insufficient, each power transmitting/receiving device of the plurality of power transmitting/receiving devices sends to the controller a request indicating a necessary amount of power to be transferred which the respective power transmitting/receiving device requests transferring of.

10. The plurality of power transmitting/receiving devices according to claim 9, wherein the request further indicates a time during which power transferring is needed.

11. A controller that is connected to each of a plurality of power transmitting/receiving devices via a communication line, each power transmitting/receiving device of the plurality of power transmitting/receiving devices being arranged for a respective electric power system of a plurality of electric power systems and transmitting electric power from one electric power system of the plurality of electric power systems to another electric power system of the plurality of electric power systems via a power transmission line, the controller comprising:
memory for storing instructions; and
a processor configured to execute the instructions to:
receive information regarding each power transmitting/receiving device of the plurality of power transmitting/receiving devices from the respective power transmitting/receiving device;
store the information regarding the plurality of power transmitting/receiving devices and including a set of power transmission tasks, each task including the power transmitting/receiving device which is to receive electric power, the power transmitting/receiving device which is to transmit electric power, a power supply of a power transferring source, a maximum amount of power to be transmitted that can be transmitted, and a minimum amount of power to be transmitted that can be transmitted;
store a priority of at least one power supply in the plurality of electric power systems;
determine, based on the priority of the at least one power supply and both or at least one of the maximum amount of power to be transmitted and the minimum amount of power to be transmitted, an amount of power to be transmitted and which power transmitting/receiving device of the plurality of power transmitting/receiving devices is to transmit electric power;
create, based on the determination, a control instruction to make the power transmitting/receiving device, which is to transmit electric power, transmit electric power, and
send the control instruction to at least the power transmitting/receiving device which is to transmit electric power, wherein each power transmitting/receiving device of the plurality of power transmitting/receiving devices manages a state of power supply and demand of the electric power system in which the respective power transmitting/receiving device is arranged, when power in the electric power system in which the respective power transmitting/receiving device is arranged is insufficient, each power transmitting/receiving device of the plurality of power transmitting/receiving devices sends to the controller a request indicating a necessary amount of power to be transferred which the respective power transmitting/receiving device requests transferring of and a time during which power transferring is needed, the information regarding the plurality of power transmitting/receiving devices includes a time during which the power transmitting/receiving device which is to transmit electric power can transmit electric power, and the processor is further configured to execute the instructions to:
compare a time during which power transferring is needed included in the request from a respective power transmitting/receiving device with the time during which power can be transmitted.

* * * * *